United States Patent
Roskovensky

(10) Patent No.: US 7,480,052 B1
(45) Date of Patent: Jan. 20, 2009

(54) OPAQUE CLOUD DETECTION

(75) Inventor: John K. Roskovensky, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 11/680,639

(22) Filed: Mar. 1, 2007

Related U.S. Application Data

(60) Provisional application No. 60/798,635, filed on May 8, 2006.

(51) Int. Cl.
*G01N 21/00* (2006.01)

(52) U.S. Cl. .................... 356/437; 356/438

(58) Field of Classification Search .............. 356/437, 356/438, 445
See application file for complete search history.

(56) References Cited

U.S. PATENT DOCUMENTS

H2208 H * 1/2008 Stytz et al.

* cited by examiner

*Primary Examiner*—Roy M Punnoose
(74) *Attorney, Agent, or Firm*—Elmer A. Klavetter

(57) ABSTRACT

A method of detecting clouds in a digital image comprising, for an area of the digital image, determining a reflectance value in at least three discrete electromagnetic spectrum bands, computing a first ratio of one reflectance value minus another reflectance value and the same two values added together, computing a second ratio of one reflectance value and another reflectance value, choosing one of the reflectance values, and concluding that an opaque cloud exists in the area if the results of each of the two computing steps and the choosing step fall within three corresponding predetermined ranges.

15 Claims, 2 Drawing Sheets

OPAQUE CLOUD DETECTION

CROSS-REFERENCE TO RELATED APPLICATIONS

This application claims priority to and the benefit of the filing of U.S. Provisional Patent Application Ser. No. 60/798,635, entitled "Visible/Near-Visible (VNIR) Opaque Cloud Detection Method", filed on May 8, 2006, and the specification and claims thereof are incorporated herein by reference.

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to methods, apparatuses, and computer software for detection of opaque clouds.

2. Description of Related Art

Particularly in analysis and/or production of satellite imagery, there is a need to accurately identify opaque clouds while, at the same time, limit the detection of thin, transparent clouds and to not falsely detect clear sky as clouds. The state of the art is discussed at length in Ackerman, et al., "Discriminating Clear-Sky from Cloud with MODIS", modis.gsfc.nasa.gov/data/atbd/atbd_mod06.pdf (Oct. 1, 2002). The present invention provides substantial improvements over the prior efforts, as discussed below.

BRIEF SUMMARY OF THE INVENTION

The present invention is of a method of detecting clouds in a digital image, comprising: for an area of the digital image, determining a reflectance value in at least three discrete electromagnetic spectrum bands; computing a first ratio of one reflectance value minus another reflectance value and the same two values added together; computing a second ratio of one reflectance value and another reflectance value; choosing one of the reflectance values; and concluding that an opaque cloud exists in the area if the results of each of the two computing steps and the choosing step fall within three corresponding predetermined ranges. In the preferred embodiment, the bands have centers within the ranges 400 nm to 460 nm, 630 nm to 690 nm, and 830 nm to 890 nm, most preferably having widths of approximately 60 nm. In the first computing step the one reflectance value corresponds to the band having a center within the range 830 nm to 890 nm and the another reflectance value corresponds to the band having a center within the range 400 nm to 460 nm, and the predetermined range for the first ratio is approximately −0.5 to 0.2. In the second computing step the one reflectance value corresponds to the band having a center within the range 830 nm to 890 nm and the another reflectance value corresponds to the band having a center within the range 630 nm to 690 nm, and the predetermined range for the second ratio is approximately 0.95 to 1.2. In the choosing step the one reflectance value corresponds to the band having a center within the range 630 nm to 690 nm, and the predetermined range for the result of the choosing step is approximately 0.2 to infinity. The method differentiates between opaque clouds and snow in the area. The method can additionally comprise the step of calculating a cloud probability value for the area, preferably calculating cloud probability (CP):

$$CP = \sqrt{\left(\sqrt{CP_{RR} \cdot CP_{NBIRD}}\right) \cdot CP_{R2}}.$$

where $CP_{RR}$ is the result of the second computing step, $CP_{NBIRD}$ is the result of the first computing step, and $CP_{R2}$ is the result of the choosing step.

The invention is also of a method of detecting clouds in a digital image, comprising: for an area of the digital image, determining a reflectance value in at least two discrete electromagnetic spectrum bands; computing a ratio of one reflectance value minus another reflectance value and the same two values added together; and concluding that snow may exist in the area if the result of the computing step falls outside a predetermined range. In the preferred embodiment, the two bands have centers within the ranges 400 nm to 460 nm and 830 to 890 nm, most preferably having widths of approximately 60 nm. In the computing step the one reflectance value corresponds to the band having a center within the range 830 nm to 890 nm and the another reflectance value corresponds to the band having a center within the range 400 nm to 460 nm, and the predetermined range for the first ratio is approximately −0.5 to 0.2.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
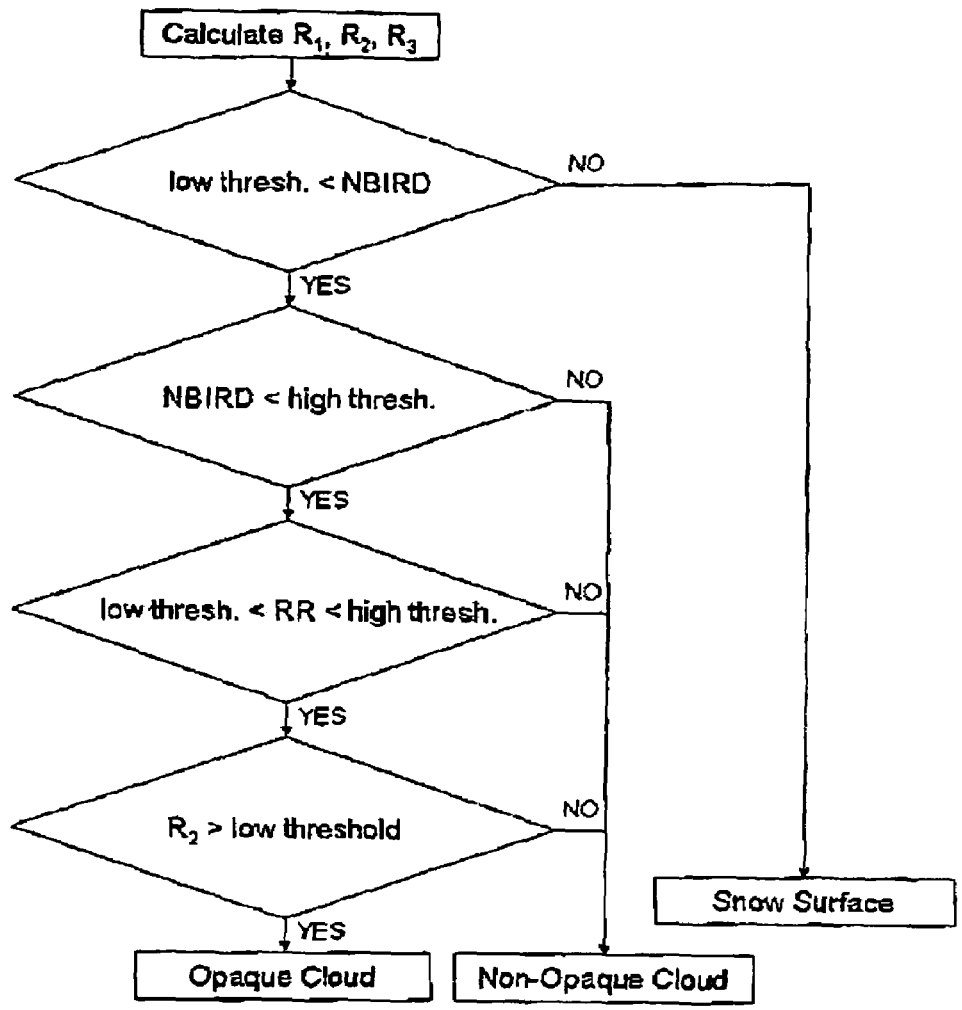
FIG. 1 is a flow chart of the preferred method of the invention as would be embodied in corresponding computer software.

The present invention is of methods, apparatuses, and computer software for detecting opaque clouds. The method of the invention is known as the Visible and Near-Infrared (VNIR) Opaque Cloud Detection Algorithm (VOCDA), and it accurately identified opaque clouds while, at the same time, limiting the detection of thin, transparent clouds and not falsely detecting clear sky as clouds.

The VOCDA is designed unlike other cloud mask algorithms in that it is not intended to detect all types of clouds. It only attempts to detect and mask opaque cloud. If a cloud is transparent so that surface features can be seen, it is to be excluded from detection and ignored. Using simulated Top of Atmosphere (TOA) radiances, it has been suggested that an opaque cloud be loosely defined as having a cloud transmittance less than 0.6.

Another quantity to be determined is the amount of cloud in a 1 square km Field-of-View (FOV). This can be estimated using two approaches: as a fractional amount of a discrete cloud mask defined at a smaller spatial resolution, and as a composite of a cloud probability field. Both of these approaches will be defined in more detail later.

In order to detect small scale clouds such as fair weather cumulus yet collect enough energy to maintain a healthy Signal-to-Noise Ratio (SNR), a 250 m nadir horizontal pixel resolution is preferred. A study using simulated data showed that increasing the spatial resolution of the data led to a decrease in opaque cloud detection and an increase in the false detection of cloud especially when examining small scale cloud structures.

The VOCDA employs TOA reflectance. Sensor measured radiance along with the solar zenith angle and a calculated solar flux are preferably used to determine there quantities. The VOCDA utilizes the three channels listed in Table 1.

TABLE 1

VOCDA band description.

| Band Number | Band Center | Bandwidth |
|---|---|---|
| 1 | 430 nm | 400 nm-460 nm |
| 2 | 660 nm | 630 nm-690 nm |
| 3 | 860 nm | 830 nm-890 nm |

The present invention employs three individual cloud tests that are designed to exclude certain clear sky situations as well as detect clouds. Each is defined below.

(i) Normalized Blue-Infrared Reflectance Difference (NBIRD). Defined as:

$$\frac{(R_3 - R_1)}{(R_3 + R_1)},$$

wherein $R_3$ is the band 3 reflectance and $R_1$ is the band 1 reflectance.

(ii) Reflectance Ratio (RR). Defined as:

$$\frac{R_3}{R_2},$$

where $R_2$ is band 2 reflectance.

(iii) Visible Reflectance ($R_2$). Defined as band 2 reflectance.

Cloud test (i) separates clear sky regions consisting of arid, sandy soil surfaces from opaque clouds since $R_1$ is considerably lower than $R_3$ in these areas. Thick clouds will generally have an NBIRD value close to 0. The preferred specific low and high thresholds for this test are given in Table 2. The thresholds stated in Table 2 have been established with the use of three simulated scenes using a nadir viewing angle. These thresholds may be adjusted as appropriate for changes in sensor zenith angle, latitude, and surface type.

TABLE 2

Example VOCDA Cloud Test Thresholds.

| Cloud Test | Low Threshold | High threshold |
|---|---|---|
| NBIRD | −0.5 | 0.2 |
| RR | 0.95 | 1.2 |
| $R_2$ | 0.2 | None |

Clouds can be expected to produce values between the low and high threshold values. Water and snow surfaces will produce a slightly negative NBIRD value that may be detected as cloud by this test.

Cloud test (ii) is designed to separate clear sky areas of vegetation, water and snow surfaces from clouds. Clouds are expected to produce a value near 1. Cloudy pixels over land will be slightly greater than 1 while cloudy pixels over water will be close to 1 or even slightly below that depending on the cloud optical thickness. The thresholds stated in Table 2 encompass the opaque cloud RR values well regardless of viewing angle. The RR value will increase rapidly with increasing levels of vegetation. Oppositely, RR values will be generally much less than 1 over water surfaces. The relatively high value of the low RR threshold (0.95) is due to the attempt to separate clear sky snow and ice pixels from clouds. Snow may often produce RR values that are slightly less than 1. This cloud test works well except in regions of barren ground, strong glint over the water or snow and ice.

Cloud test (iii) utilizes a single-channel reflectance by virtue that opaque clouds are generally brighter than clear sky regions. This will not always be true, of course, especially over non-absorbing surfaces such as deserts and snow/ice fields. A low threshold of at least 0.2 will filter out the majority of the ocean sun glint. The test does not require a high threshold. In addition, since cloud reflectance is proportional to cloud optical thickness in this band, this test may also prove helpful by tuning the low threshold to restrict the detection of thin clouds.

The VOCDA preferably works by utilizing all three cloud tests simultaneously as depicted in the flow chart in FIG. 1.

An opaque cloud can only be detected if all three could tests are passed. This process is considered to be cloud conservative since the failure of any test results in the non-opaque cloud classification. Note, that the non-opaque cloud description includes both thin cloud and clear sky. This method is appropriate for minimizing over-detection (too many clouds) and the false detection of clouds. It also lends itself to an easy reduction of the number of clouds detected, because the adjustment of any single test can accomplish this.

The invention also produces values that are described in separate sections below. These can be utilized for further processing of imagery according to desired application.

The Cloud Mask (CM) is a one-bit variable field containing the results of the VOCDA described above. Each bit represents the cloud detection result at a single pixel (0=non-opaque cloud, 1=opaque cloud). This product is preferably produced at the highest spatial resolution (250 m at nadir).

The Cloud Fraction (CF) is defined as the cloud percentage, as determined by the CM, in a 1 km×1 km region. The formula for calculating the CF is $$\frac{\text{Number of Opaque Cloud Pixels}}{\text{Total number of Pixels}}.$$

The total number of pixels is defined as the number of high resolution pixels, at which the CM product is produced, contained inside a 1 km×1 km square area on the ground. This number will vary with viewing geometry. At nadir, the total number of pixels (at 250 m spatial resolution) in this 1 km×1 km square region is 16. The number of opaque cloud pixels from this total is used as the numerator in the fraction above. This product is preferably stored as a 32-bit floating point number in an array of dimension roughly four times smaller than that of the CM.

Figure 2:
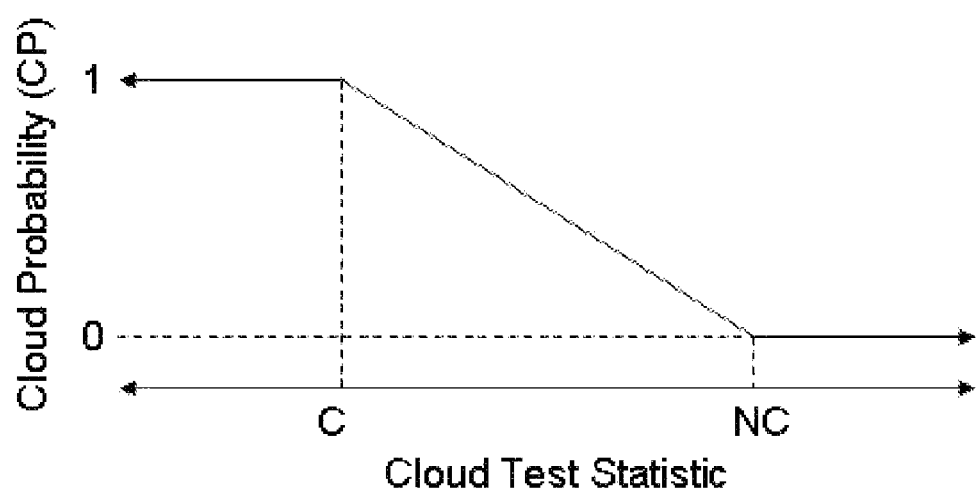
FIG. 2 is a diagram showing the preferred calculation of Cloud Probability according to the invention.

The Cloud Probability (CP) quantifies the probability of the existence of a cloud in a certain FOV. It may also be described as a measure of the cloud transmittance or transparency. As opposed to the more black-and-white results of the CM, the CP applies more of a gray scale approach. The same three cloud tests, described in section 3, are employed, but instead of using distinct thresholds to separate clouds from non-clouds, a broad gray-zone is applied to which a gradual change from cloud to non-cloud is made. In this threshold-zone a value from 0-1 is given based upon the test statistic proximity to an absolute boundary, where 0 represents non-cloud and 1 represents cloud. FIG. 2 shows how this assignment is preferably made based on the cloud (C) and non-cloud (NC) boundary values.

Cloud test statistic values lying within these boundaries define a Cloud Probability (CP) through linearly interpolation between 0 and 1. A CP value is determined for each cloud test: $CP_{NBIRD}$, $CP_{RR}$, and $CP_{R2}$. Exemplary C and NC boundaries pertaining to the low and high cloud test thresholds for each test are given in Table 3.

TABLE 3

Preliminary Cloud Probability Boundary Thresholds.

| Cloud Test | Low Boundaries | | High Boundaries | |
|---|---|---|---|---|
| | NC | C | C | NC |
| NBIRD | −0.5 | −0.1 | 0.05 | 0.25 |
| RR | 0.8 | 0.97 | 1.15 | 1.45 |
| $R_2$ | 0.2 | 0.3 | None | None |

To understand how a CP value is assigned, imagine three pixels with RR values of 1.08, 1.39, and 1.74. The $CP_{RR}$ values for each pixel would be 1.0, 2.0, and 0.0, respectively. The first pixel has a RR value clearly inside the cloudy range (between the low and high boundary C values). The second pixel RR value is located ⅘ of the way from the high boundary C and NC thresholds so that it is interpolated accurately from 1 to 0. The RR value of the last pixel is well beyond the non-cloud (NC) high threshold so it is assigned the Cloud Probability value of 0. The assumption associated with the individual CP values is that as a cloud becomes optically thinner, more of the radiometric information stemming from the surface will be present in the cloud test statistic so that a linear scale can be imposed upon the statistic to retrieve an estimate of the transmittance of the cloud.

The pixel Cloud Probability (CP) is preferably determined by the following equation:

$$CP = \sqrt{\left(\sqrt{CP_{RR} \cdot CP_{NBIRD}}\right) \cdot CP_{R2}}.$$

This formula takes the results of all three cloud tests into account by using the visible reflectance ($R_2$) test as a scalar for the combined result of the first two cloud tests. In doing so, it weights the pixel CP slightly in favor of the $CP_{R2}$ value. It should be noted that any single cloud test CP value of 0 will result in a 0 value for the pixel CP. In order to receive a pixel CP of 1, all three cloud test CP values must equal 1, or indicate cloud. This CP product will be output as a 32-bit floating point number in an array with dimensions determined at the highest spatial resolution (250 m at nadir).

To summarize the present invention, which summary is not meant to be exclusive of other features, benefits, and purposes, the invention preferably operates as follows:

(1) Calculate Reflectance in the VNIR bands (preferably three).

(2) Perform all 3 cloud tests, preferably in the following sequence:
   i. NBIRD—a test unique in its ability to decipher snow surfaces from clouds;
   ii. RR (Reflectance Ratio)—to decipher vegetation and water surfaces from clouds; and
   iii. R (Single band reflectance Test)—"Brightness" test.

(3) Form a Cloud mask (CM) product as 1 if all 3 cloud tests are passed or 0 otherwise. This product is unique from other cloud masks because it is really only an opaque cloud mask. It does not detect thin, transparent clouds in which it is possible to see through to the ground from space.

(4) Calculate the Cloud Fraction (CF) for each 1 km×1 km grid.

(5) Calculate the Cloud Probability (CP), which is inversely correlated to cloud transmittance. Although cloud probabilities exist in other algorithms, the VOCDA uses a new equation that can also approximate cloud transmittance.

As understood by one of ordinary skill in the art, the invention can be implemented in computer hardware, firmware, and/or software in any of a variety of ways. For example, the image processing can occur on a mainframe or personal computer via software only, on an Application Specific Integrated Circuit (ASIC) board, in an appropriately programmed Field Programmable Gate Array (FPGA), etc.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of detecting clouds in a digital image, the method comprising the steps of:

for an area of the digital image, determining a reflectance value R1 in a discrete electromagnetic spectrum band from 400 nm to 460 nm, a reflectance value R2 in a discrete electromagnetic spectrum band from 630 nm to 690 nm and a reflectance value R3 in a discrete electromagnetic spectrum band from 830 nm to 890 nm;

computing in a first computing step a first ratio of the R3 reflectance value minus the R1 reflectance value and the same two values added together;

computing in a second computing step a second ratio of the R3 reflectance value and to the R2 reflectance value;

choosing the R2 reflectance value; and concluding that an opaque cloud exists in the area if the results of each of the two computing steps and the choosing step fall within three corresponding predetermined ranges.

2. The method of claim 1 wherein in the first computing step the one reflectance value corresponds to the band having a center within the range 830 nm to 890 nm and the second reflectance value corresponds to the band having a center within the range 400 nm to 460 nm.

3. The method of claim 2 wherein the predetermined range for the first ratio is approximately −0.5 to 0.2.

4. The method of claim 1 wherein in the second computing step the one reflectance value corresponds to the band having a center within the range 830 nm to 890 nm and the second reflectance value corresponds to the band having a center within the range 630 nm to 690 nm.

5. The method of claim 4 wherein the predetermined range for the second ratio is approximately 0.95 to 1.2.

6. The method of claim 1 wherein in the choosing step the one reflectance value corresponds to the band having a center within the range 630 nm to 690 nm.

7. The method of claim 6 wherein the predetermined range for the result of the choosing step is approximately 0.2 to infinity.

8. The method of claim 1 wherein the method differentiates between opaque clouds and snow in the area.

9. The method of claim 1 additionally comprising the step of calculating a cloud probability value for the area.

10. The method of claim 9 wherein the calculating step comprises calculating cloud probability (CP):

$$CP = \sqrt{\left(\sqrt{CP_{RR} \cdot CP_{NBIRD}}\right) \cdot CP_{R2}},$$

where $CP_{RR}$ is the result of the second computing step, $CP_{NBIRD}$ is the result of the first computing step, and $CP_{R2}$ is the result of the choosing step.

11. A method of detecting the existence of snow in a digital image, the method comprising the steps of:
   for an area of the digital image, determining a reflectance value R1 in a discrete electromagnetic spectrum band from 400 nm to 460 nm and a reflectance value R2 in a discrete electromagnetic spectrum band from 830 nm to 890 nm;
   computing a ratio of one reflectance value selected from R1 and R2 minus another reflectance value selected from R1 and R2 and the same two values added together; and
   concluding that snow exists in the area if the result of the computing step falls outside a predetermined range.

12. The method of claim 11 wherein in the computing step the one reflectance value corresponds to the band having a center within the range 830 nm to 890 nm and the another reflectance value corresponds to the band having a center within the range 400 nm to 460 nm.

13. The method of claim 12 wherein the predetermined range for the first ratio is approximately −0.5 to 0.2.

14. Computer software stored on a computer-readable medium for detecting clouds in a digital image, said computer software being embodied on a computer readable medium and comprising:
   software stored on a computer-readable medium that, for an area of the digital image, determines a reflectance value in at least three discrete electromagnetic spectrum bands;
   software stored on a computer-readable medium computing a first ratio of one reflectance value minus another reflectance value and the same two values added together;
   software stored on a computer-readable medium computing a second ratio of one reflectance value and another reflectance value;
   software stored on a computer-readable medium computing one of the reflectance values; and
   software stored on a computer-readable medium for concluding that an opaque cloud exists in the area if the result of each of the three computing steps falls within three predetermined ranges.

15. Computer software stored on a computer-readable medium for detecting clouds in a digital image, said computer software being embodied on a computer readable medium and comprising;
   software stored on a computer-readable medium that, for an area of the digital image, determining a reflectance value in at least two discrete electromagnetic spectrum bands;
   software stored on a computer-readable medium computing a ratio of one reflectance value minus another reflectance value and the same two values added together; and
   software stored on a computer-readable medium for concluding that snow may exist in the area if the result of the three computing step falls outside a predetermined range.

* * * * *